US012259305B2

(12) United States Patent
Orth et al.

(10) Patent No.: US 12,259,305 B2
(45) Date of Patent: Mar. 25, 2025

(54) LABORATORY MILL

(71) Applicant: Retsch GmbH, Haan (DE)

(72) Inventors: Uwe Orth, Monschau (DE); Zilan Orhan, Witten (DE); Stefan Mahler, Velbert (DE); Alexander Mühlig, Cologne (DE)

(73) Assignee: Retsch GmbH, Haan (DE)

( * ) Notice: Subject to any disclaimer, the term of this patent is extended or adjusted under 35 U.S.C. 154(b) by 649 days.

(21) Appl. No.: 17/417,607

(22) PCT Filed: Sep. 1, 2020

(86) PCT No.: PCT/EP2020/074288
§ 371 (c)(1),
(2) Date: Jun. 23, 2021

(87) PCT Pub. No.: WO2021/043739
PCT Pub. Date: Mar. 11, 2021

(65) Prior Publication Data
US 2022/0113226 A1   Apr. 14, 2022

(30) Foreign Application Priority Data

Sep. 6, 2019   (DE) .......................... 102019123976.1
Dec. 30, 2019   (DE) .......................... 102019135864.7
Jan. 23, 2020   (DE) .......................... 102020101565.8

(51) Int. Cl.
*G01N 1/28*   (2006.01)
*B02C 17/14*   (2006.01)
(Continued)

(52) U.S. Cl.
CPC ............. *G01N 1/286* (2013.01); *B02C 17/14* (2013.01); *B02C 17/186* (2013.01); *B02C 23/00* (2013.01);
(Continued)

(58) Field of Classification Search
CPC . B02C 17/186; B02C 17/1875; B02C 17/188; B02C 17/1895; B02C 23/18;
(Continued)

(56) References Cited

U.S. PATENT DOCUMENTS 4,363,217 A * 12/1982 Venuti .................... F04B 37/08
62/55.5
2005/0115699 A1 * 6/2005 Nuris ...................... B01J 19/18
165/163
(Continued)

FOREIGN PATENT DOCUMENTS

DE   102006047498 A1   4/2007
EP   2391454 B1   6/2019
(Continued)

OTHER PUBLICATIONS

University of Iowa, "Liquid Nitrogen Handling", https://ehs.research.uiowa.edu/liquid-nitrogen-handling#:~:text=Impact%20resistant%20containers%20that%20can,liquid%20nitrogen%20in%20a%20container). (Year: 2023).*
(Continued)

*Primary Examiner* — Jared O Brown
(74) *Attorney, Agent, or Firm* — Andrus Intellectual Property Law, LLP (57) ABSTRACT

A laboratory mill is shown and described with at least one oscillatably mounted grinding bowl holder for at least one grinding bowl and with at least one line for transporting a liquid or gaseous medium, the line having at least one compensating element for compensating relative movements between the grinding bowl holder and/or the grinding bowl and a stationary part of the laboratory mill. In accordance with the invention, a rigid compensating element is provided for compensating relative movements, wherein the compensating element is elastically deformed at least in regions during an oscillating movement of the grinding bowl
(Continued)

holder and wherein the compensation of relative movements is effected free of parts of the compensating element connected to one another so as to be movable, in particular rotatable and/or pivotable, relative to one another and only by elastic deformation of the compensating element.

16 Claims, 6 Drawing Sheets (51) Int. Cl.
    *B02C 17/18*     (2006.01)
    *B02C 23/00*     (2006.01)
    *G01N 1/42*     (2006.01)

(52) U.S. Cl.
    CPC ....... *G01N 1/42* (2013.01); *G01N 2001/2866* (2013.01)

(58) Field of Classification Search
    CPC ......... B02C 23/24; B02C 23/26; B02C 23/28; B02C 23/34; B02C 23/40
    See application file for complete search history.

(56) References Cited

U.S. PATENT DOCUMENTS

| | | | | |
|---|---|---|---|---|
| 2011/0303776 | A1* | 12/2011 | Mahler | B02C 17/186 241/38 |
| 2013/0139541 | A1* | 6/2013 | Seybold | F25B 40/00 165/154 |

FOREIGN PATENT DOCUMENTS

| | | | | |
|---|---|---|---|---|
| GB | 1265735 | A | 3/1972 | |
| GB | 2257379 | A | 1/1993 | |
| JP | S4519210 | Y1 | 8/1970 | |
| JP | S63174526 | U | 11/1988 | |
| JP | H08196927 | A | 8/1996 | |
| JP | 2000045765 | A | 2/2000 | |
| JP | 2001334157 | A | 12/2001 | |
| JP | 2012516236 | A | 7/2012 | |
| JP | 2017145169 | A | 8/2017 | |
| WO | WO-2021064984 | A1 * | 4/2021 | ............. B02C 17/08 |

OTHER PUBLICATIONS

Technifab Products, Inc., "Vacuum Jacketed Piping—What you need to know", https://www.technifab.com/vacuum-jacketed-piping/ (Year: 2023).*

Federal Steel Supply, 'Cryogenic Piping: What It Is & How It's Used', https://www.fedsteel.com/insights/cryogenic-piping-what-it-is-how-its-used/ (Year: 2024).*

International Search Report issued in corresponding PCT Application No. PCT/EP2020/074288, mailed Nov. 27, 2020.

Written Opinion issued in corresponding PCT Application No. PCT/EP2020/074288, mailed Nov. 27, 2020.

Notice of Reasons for Refusal in Corresponding Japanese Application No. 2022-514686, Jul. 18, 2023.

* cited by examiner

LABORATORY MILL

CROSS-REFERENCE TO RELATED APPLICATIONS

This application is the U.S. national stage application of International Application PCT/EP2020/074288, filed Sep. 1, 2020, which International Application was published on Mar. 11, 2021, as International Publication WO 2021/043739 in the German language. The International Application claims priority to German Application Nos. 10 2019 123 976.1, filed Sep. 6, 2019; 10 2019 135 864.7, filed Dec. 30, 2019; and 10 2020 101 565.8, filed Jan. 23, 2020. The International Application and German Applications are hereby incorporated herein by reference, in their entireties.

FIELD

The invention relates to a laboratory mill with at least one oscillatably mounted grinding bowl holder for at least one grinding bowl and with at least one line for transporting a liquid or gaseous medium, the line having at least one compensating element for compensating relative movements between the grinding bowl holder and/or the grinding bowl and a stationary part of the laboratory mill.

BACKGROUND

In oscillating mills for laboratory use, it is known that for efficient comminution of particularly brittle materials, additional embrittlement of the material to be comminuted can be induced by cooling with liquid nitrogen. In known processes, cooling is achieved, for example, by immersing the grinding bowl in liquid nitrogen, which floods a grinding bowl holder. For this purpose, the liquid nitrogen must be continuously fed to the grinding bowl holder and led away from it. In this connection, it is known that the supply of the liquid or gaseous medium, for example nitrogen, is carried out by means of appropriately arranged flexible hoses. In this case, the hoses are attached directly to the grinding bowl holder, whereby a fluidic connection then exists between the grinding bowl holder and the grinding bowl used. In practical use, however, these flexible hose connections have a short service life due to the large amplitude of the alternating stress caused by the movement of the grinding bowl. Additional safety precautions are therefore necessary, especially when using liquid nitrogen as a cooling medium, in order to exclude any danger to persons in case of failure of the hose connections.

In addition to the use of nitrogen, other applications use the short-term local release of large amounts of energy during the grinding process to initiate chemical reactions. Depending on the reactions occurring, the grinding bowl may have to be cooled or heated. This also requires its continuous supply with a medium for tempering the reaction chamber.

In other applications, the grinding process releases gases which can be the subject of further analysis. These gases must therefore be continuously removed from the grinding bowl and the volume removed must be balanced by an appropriate gas supply.

From EP 2 391 454 B1, a laboratory mill with rotary unions for the grinding jars to be supplied with a medium is known. In this case, two lines for the supply and discharge of the medium are connected to each grinding bowl and both lines are routed through the rotary union, whereby two external connections for the stationary lines of the laboratory mill are formed on the stationary part of the rotary union and two internal connections for the lines leading to the grinding bowl are formed on the moving part of the rotary union.

By using a rotary union, the connection of the grinding bowl to the supply or discharge line for the medium can be made via a largely rigid line system, whereby relative movements between the movable grinding bowl and the stationary part of the rotary union or a stationary supply or discharge system connected to the stationary lines on the rotary union are compensated via the movable part of the intermediate rotary union which is movable relative to the stationary part. The respective movements are reduced to the smallest possible radius within the rotary union. Because of the minimized relative speed and relative movement between the stationary and moving parts of the rotating union, a contacting seal can be used, which is effective between the aligned bore sections in both the stationary and moving parts of the rotating union.

Although relative movements between the movable grinding bowl and a stationary connection on the laboratory mill can be well compensated by the use of a rotary union, the alternating stress caused by the movement of the grinding bowl can lead to fatigue of the contacting seal in the rotary union, so that a permanently leak-proof connection between the movable part and the stationary part of the rotary union is not guaranteed. As a result, leakage may occur, i.e. the medium carried to and from the grinding bowl via the line, and thus contamination of the environment and loss of the medium. In addition, the use of an additional component designed as a rotary union to compensate for relative movements leads to increased installation work and higher equipment costs of the well-known laboratory mill.

In another version of the laboratory mill known from EP 2 391 454 B1, no holes are formed inside the stationary part and the moving part of the rotary union. Instead, the associated connections for the feed line or return line are connected to the stationary part on the one hand and the connections for the feed line and return line to the moving part on the other hand by flexible line sections in the form of hoses. As already described above, however, hose connections have a short service life due to the alternating stress, so that even here a leakage-free connection cannot be guaranteed for a long operating time of the mill.

From the GB 2 257 379 A, a laboratory mill for grinding a particle-containing suspension to be ground is known. During the grinding process, the suspension is continuously fed from a tank via a stationary pipe to the rotating grinding bowl. For this purpose, a rotary union is formed between the stationary line and the feed line arranged to the grinding bowl by bringing the end of the stationary line as a stationary part into a sliding connection with the end of a movable nozzle coupled to the rotational movement of the grinding bowl.

GB 1 265 735 A describes a mill with a grinding vessel whose shell is cooled by the supply of a coolant. Here, too, the coolant is fed from a stationary pipe into a pipe section rotating with the grinding vessel by means of a rotary union.

SUMMARY

The invention is based on the task of providing a laboratory mill with the features mentioned at the beginning, in which relative movements occurring during operation of the laboratory mill between the grinding bowl holder or grinding bowl and a stationary part of the mill are compensated for in a simple design and at low equipment costs and in which the compensation of movements ensures a high degree of safety against the occurrence of leakages during long-term operation of the mill.

The aforementioned task is solved by a mill with the characteristics of the independent claim(s). Advantageous embodiments of the invention are subject of the dependent claims.

For the solution of the above-mentioned task, a first alternative embodiment of the invention provides a substantially rigid or rigidly designed compensating element which is elastically deformed at least in some areas during an oscillatory movement of the grinding bowl support to compensate for relative movements, the compensation of relative movements being effected free of relative movements movable relative to one another, in particular rotatable and/or pivotable, mechanically and/or slidingly connected to one another via a pivot point or an axis of rotation, separate parts of the compensating element being mechanically and/or slidingly connected to one another. The compensation of relative movements is preferably affected substantially only or exclusively by elastic deformation of the compensation element.

The compensating element enables, by means of preferably only elastic, and in particular non-plastic or non-plastic-elastic, deformation, a substantially stress-neutral compensation of relative movements with low deformation resistance, so that the deformation of the compensating element during the oscillatory movement of the grinding bowl support results in no or only a negligible increase in the motor drive power required to generate the oscillatory movement. In addition, a simple design of the motion compensation is possible, which allows low-maintenance operation and low manufacturing costs of the mill according to the invention.

The absence of movably connected parts of the compensating element ensures a permanently hermetically sealed connection between the grinding bowl holder and/or the grinding bowl and the stationary part of the mill. In particular, the invention permits a connection between the grinding bowl support and/or the grinding bowl performing the oscillating movement on the one hand and a stationary part of the mill on the other hand, in which rotary unions, sealing elements and/or flexible hoses need not be provided to compensate for relative movements.

The compensation element acts as a spring element that compensates relative movements by deflection or deformation in certain areas. When compensating the relative movements, the compensation element itself can be set into oscillation.

The compensating element is particularly preferred as a torsion spring or acts as such.

The spring stiffness of a compensating line provided for the transport of a liquid or gaseous medium between a stationary part of the laboratory mill on the one hand and the vibrating grinding bowl support and/or the grinding bowl on the other hand, in particular the spring stiffness of a metallic line, further in particular of a substantially rigid pipeline, can be in the range between 0.05 Nm/DEG and 5.0 Nm/DEG. Preferably the spring stiffness is in the range between 0.1 and 0.5 Nm/DEG, for example between 0.1 and 0.2 Nm/DEG.

Depending on the stiffness of the compensating element, the spring stiffness of the line connection between the grinding bowl support and/or the grinding bowl and/or the stationary part of the laboratory mill can also be greater. The above-mentioned values refer in particular to a design of the line connection between the grinding bowl support and/or the grinding bowl on the one hand and the stationary part of the laboratory mill on the other hand as a rigid pipeline with a helical or in the form of a flat or spatial spiral designed line section as compensating element. Maximum spring stiffness can be achieved by a rigid metallic pipe without coils. The spring stiffness can then assume values between 2 and 4 Nm/DEG, for example. If the spring stiffness is too high, however, plastic deformation will occur even at low deflection of the pipe connection as a result of the oscillating movement of the laboratory mill, so that a permanent compensation of relative movements via the pipe connection is impaired. Even a few load cycles can then lead to plastic deformation of the line connection and even to line breakage.

When calculating the spring stiffness, the line is treated as a unilaterally clamped beam which is deflected at its "free" end, i.e. the end of the line to be connected to the grinding bowl support and/or the grinding bowl, as a result of the vibrating movement of the grinding bowl support and/or the grinding bowl. The spring stiffness of the pipe results from the quotient of the torque resulting at the oscillating end of the pipe in [Nm] and the angle of rotation in [angular degree, DEG] of the deflection at the oscillating end of the pipe, whereby the oscillating end of the pipe is connected to the grinding bowl holder and/or the grinding bowl. The angle of rotation of the deflection results from the deflection of the oscillating end of the line during operation of the laboratory mill in relation to the length of the lever arm between the stationary line end and the oscillating end of the line. The angle of rotation corresponds to the quotient formed by the deflection and the lever arm.

According to the invention, a preferably essentially rigid or rigid compensation element is used to compensate for relative movements. An "essentially rigid or rigid compensating element" in the sense of the invention is one which still has a sufficiently low stiffness to allow compensation of relative movements between the grinding bowl support and/or the grinding bowl and a stationary part of the laboratory mill during operation of the laboratory mill by elastic deformation. The stiffness describes the resistance of the compensation element to deformation caused by forces or moments occurring during the relative movement of the grinding bowl support and/or the grinding bowl on the one hand and the stationary part of the laboratory mill on the other hand. The stiffness of the compensating element depends on the one hand on the elastic properties of the material, i.e. the modulus of elasticity, and on the other hand on the geometry of the compensating element.

The term "rigid" or "stiff" compensating element is used in particular to distinguish it from flexible hoses. The term "rigid" or "stiff" compensating element in the sense of the invention refers in particular to spring elements which have a significantly higher stiffness compared to flexible hoses, but which are deflected as a result of the oscillating movement of the grinding bowl support and automatically return to their original shape after the oscillating movement has ended.

The line and/or the compensating element may be made of metal, in particular of stainless steel, or of a plastic, in particular PTFE, and/or have a metal, in particular stainless steel, and/or a plastic, in particular PTFE. If plastic materials are used, it is preferable to have a temperature resistance and resistance to embrittlement at temperatures of −100° C. or less, in particular at less than −150° C.

The line and/or the compensating element may in particular consist of a plastic and/or have a plastic selected from the group of polyphenylene sulfides, in particular PPS GF40, perfluoroalkoxy polymers (PFA), liquid crystalline polymers, in particular LCP GF30, LCP GF30 HT, LCP GF30 ELS, the polycarbonates, in particular PC V0, PC V0 E, PC FDA, PC USP, PC GF10 V0, PC GF30, the polysulphones, in particular PSU GF20, PSU GF30, the polyether sulphones, in particular PES GF20, PES GF30, the polyphenylsulphones; polyetherimides, in particular PEI GF30, PEI GF30 FAR; polyethylenes, in particular PE-UHWM, PE-HMW, PE-HD, PE-LD; and/or ethylene-vinyl acetate copolymers (E/VA) and/or polyamides.

The production of the line and/or the compensating element can be done by additive manufacturing processes, such as laser sintering, in which spatial structures are produced by sintering with a laser from a powdery starting material. A polymeric starting material and/or a metallic starting material can be used.

The compensation element is preferably made of metal, especially stainless steel or a light metal such as aluminum. This ensures that the compensating element is material resistant even at low temperatures.

Preferably the compensating element is designed as a tubular body. Here the term "tubular body" is to be understood broadly and includes any elongated hollow body whose length is greater than its diameter. In contrast to a hose, the tubular body is made of relatively inflexible material. Preferably, the tubular body has a circular cross-section, although tubular bodies with rectangular, oval and other cross-sections can also be used as compensating elements. The outer diameter of the tubular body can be between 4 and 12 mm, preferably between 6 and 10 mm, for example 8 mm. The wall thickness of the tubular body can be between 0.1 and 1.0 mm, preferably between 0.2 and 0.5 mm.

The pipe body may preferably have a smooth, non-corrugated outer and/or inner jacket surface. This allows the use of standard piping to form the compensating element.

A stationary part of the mill connected to the line to the grinding bowl support and/or to the grinding bowl is a component or area of the mill which is arranged stationary relative to the grinding bowl support and is decoupled from the oscillating movement of the grinding bowl support or does not follow the oscillating movement of the grinding bowl support. The stationary part of the laboratory mill can, in particular, be connected to a supply and disposal system for the medium. A stationary part of the mill can, for example, be arranged together with a bearing of the grinding bowl holder on a common base plate and/or connected to a bottom part of the mill. However, this does not exclude the possibility that the stationary part of the mill and the grinding bowl support are mounted in vibration-damped bearings and are set into vibration during operation of the mill.

An "oscillating movement" of the grinding bowl support or the grinding bowl is, in the sense of the invention, any periodic movement, in particular pivoting or rotating movement, of the grinding bowl support or the grinding bowl, whereby a pure rotational movement of the grinding bowl support or the grinding bowl of 360° is excluded. During operation of the mill, the grinding bowl preferably performs circular swiveling movements, further preferably over an angle of rotation of less than 20°, particularly preferably less than 15°, for example approx. 12°.

The oscillation path of the grinding bowl, relative to a center point of a grinding chamber inside the grinding bowl, can be between 15 and 60 mm, preferably between 20 and 50 mm, for example between 20 and 30 mm. In terms of the invention, the oscillation travel is related to twice the amplitude length during the periodic to and for movement of the grinding bowl.

It is particularly useful if the compensating element is made of a material resistant to cold at temperatures below −150° C., especially at temperatures below −190° C. In particular, the compensating element is made of a material that is resistant at low temperatures, especially at the boiling temperature of nitrogen, i.e. under normal pressure at −196° C., and does not tend to become brittle. Furthermore, in particular, the compensating element is made of a material that does not embrittle cold at low temperatures, which can lead to fractures if the design does not take this sufficiently into account. In principle, the compensating element could also be made of a plastic material that has a sufficiently low glass transition temperature, below which the material changes from a soft to a brittle, glassy state.

It is further advisable if the line provided for the transport of the gaseous or liquid medium is designed as a rigid pipeline over the entire length between a connection to the grinding bowl support and/or the grinding bowl and a connection to the stationary part of the mill and thus in particular does not have any flexible hose-shaped sections and/or sealing elements. Exceptions can be ring seals at the connection points of the pipe to the grinding bowl support and/or the grinding bowl or the stationary part of the mill. The line can be designed in one or more parts. Preferably, the line is designed to be uninterrupted at least in the area of the compensating element or section, which essentially enables the compensation of relative movements between the grinding bowl support and/or the grinding bowls and the stationary part.

If the line is designed as a rigid pipeline over its entire length, the vibrating movement of the grinding bowl support can generally cause elastic deformation of the line over the entire length of the line, so that the entire line then acts as a compensating element. The line can then act in the manner of a spring, for example a rod spring.

Preferably, however, the compensating element is formed by a section of the pipeline that does not extend to the ends of the line. For example, due to the geometry of the pipe routing, a pipe section can be formed which acts as a resilient compensating element and which is deformed more than the pipe ends of the pipe during the oscillating movement of the grinding bowl support. The pipe ends are preferably deformed little or not at all during the oscillating movement of the grinding bowl support.

In principle, the compensating element can also be formed by a straight pipeline section of the line. However, in the case of a preferred design, a pipeline section of the line acting as a compensating element is at least in sections curved or angled and a forms a baffle. In the case of a preferred design, however, it is provided that a pipeline section of the line acting as a compensating element is designed to be curved or angled at least in sections and forms a baffle or line extension in the line guide, wherein the line can have, in particular, further straight line pipeline sections adjacent to the compensating element, which line sections lead in the direction of the grinding bowl holder or the grinding bowl on the one hand and/or in the direction of the stationary part on the other hand and are connected or can be connected by the ends to the grinding bowl holder or the grinding bowl and the stationary part.

An alternative aspect of the invention concerns the compensation of relative movements between the grinding bowl support and/or the grinding bowl on the one hand and the stationary part of the mill on the other hand by increasing the length of a conduit provided for connecting the grinding bowl support and/or the grinding bowl to the stationary part of the mill. For this purpose, a compensating element may be provided in the conduit or form a section of the conduit which has a geometry deviating from a straight-line shape or a non-straight conduit path. This aspect of the invention can be realized in the same way for rigid or stiff compensating elements, such as rigid pipe sections, and also for flexible compensating elements, such as flexible hoses. Thus an increase in the actual line length compared to a straight line can be achieved in a simple manner. Due to the greater line length, a sufficiently large deformation is possible to compensate for relative movements with low deformation resistance.

Figure 6:
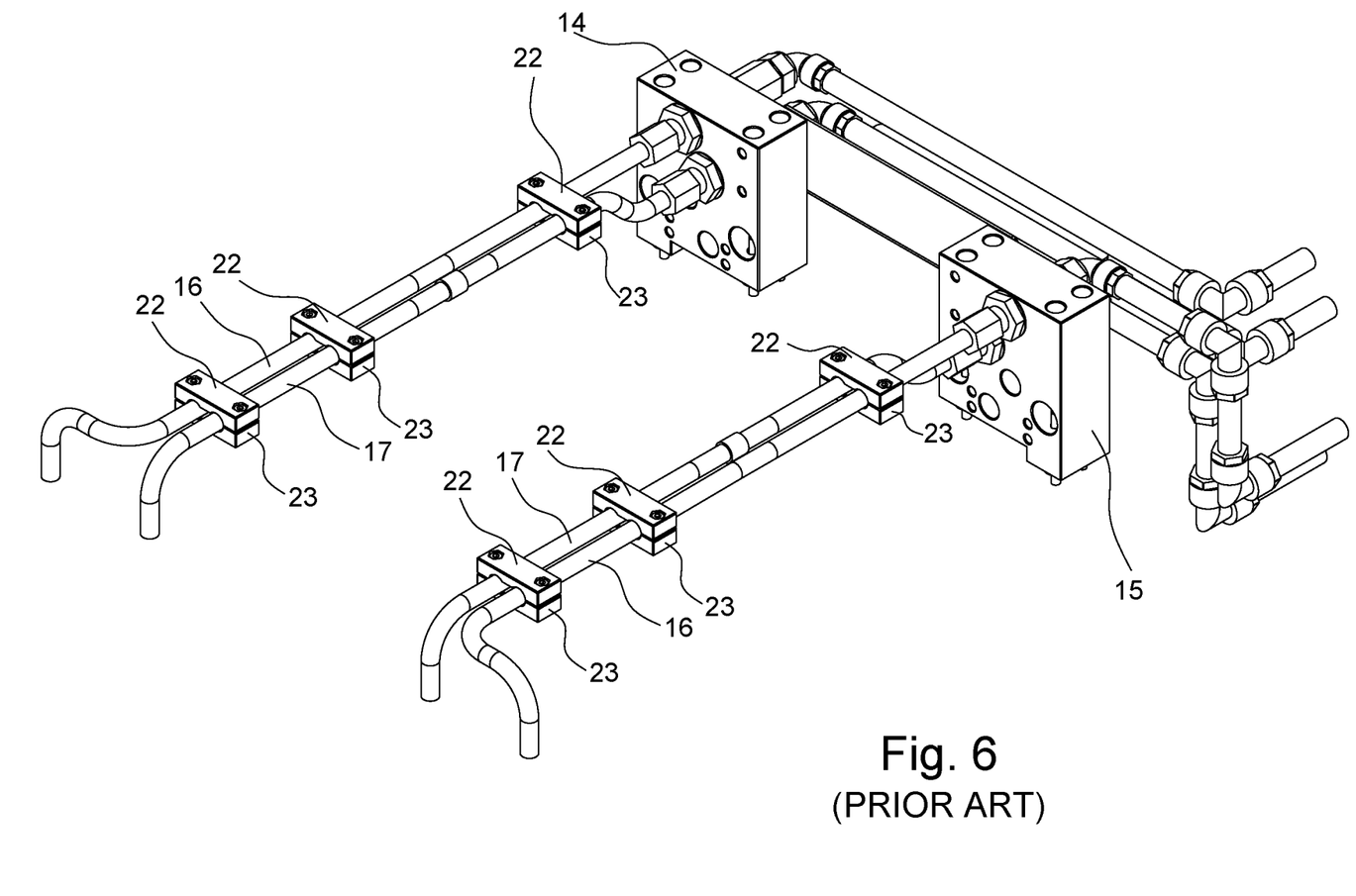
FIG. 6 is a perspective view of several lines of a laboratory mill in a prior art arrangement.

The ratio of the length of the bent and/or angled pipe or hose section to the length of the line with corresponding straight-line routing (see FIG. 6) between a line start of the compensating element and a line end of the compensating section may preferably be at least 5, further preferably at least 10, in order to ensure a sufficiently low deformation resistance when compensating for relative movements. The beginning and the end of the compensating element can be defined by the line transition from a spirally or helically bent line section to essentially straight-line sections leading to the grinding bowl support and/or the grinding bowl on the one hand and to the stationary part of the mill on the other hand.

For example, the compensating element can be formed by a U-shaped or bellows-like line section of the line. Tests carried out in connection with the invention have shown that in particular a line section provided as a compensating element, which is helical or in the form of a flat or spatial spiral, exhibits particularly good deformation behavior with low deformation resistance. The line element can then be designed in the form of a torsion spring. The alternating stress caused by the vibrating grinding bowl then causes a decreasing deflection of the compensating element from coil to coil. Due to the design in the manner of a torsion spring, length compensation is possible in all spatial directions.

The pipe section can have circular or approximately circular windings. The windings can also be polygonal with, for example, straight side sections and curved corner sections. The line section forming the compensating element is particularly preferred to have a plurality of turns, for example at least three, preferably four or five turns.

The grinding bowl support and/or a grinding bowl can be connected and/or connectable to at least two lines for the supply and discharge of a liquid or gaseous medium, each line then having at least one rigid compensating element acting in the manner of a spring element. This ensures a permanently leak-proof connection of both lines. With the design described above, each compensating element can be designed as a helically bent line section or as a flat or spatial spiral.

In order to minimize the installation space required for the arrangement of the compensation elements in a mill housing, the line sections of the two lines provided for compensation can be designed as nested and/or interpenetrating spatial structures.

A particularly space-saving arrangement and the assurance of sufficiently long deformation sections in both lines are possible if the compensating elements of the two lines are each designed as a helical line section or in the form of a flat or spatial spiral—the line sections have a different number of turns and/or a different circumference.

The pipe connecting the stationary part of the laboratory mill with the grinding bowl holder and/or the grinding bowl and the compensating element can be designed as one piece.

With regard to the application of the laboratory mill, it is preferably intended that the medium is a liquid nitrogen or that the liquid or gaseous medium used is tempered, for example to generate a heating or cooling effect for the grinding jar, or that the medium consists of an analysis gas.

BRIEF DESCRIPTION OF THE DRAWINGS

The drawings shows examples of the invention, which are described below.

DETAILED DESCRIPTION

Figure 1:
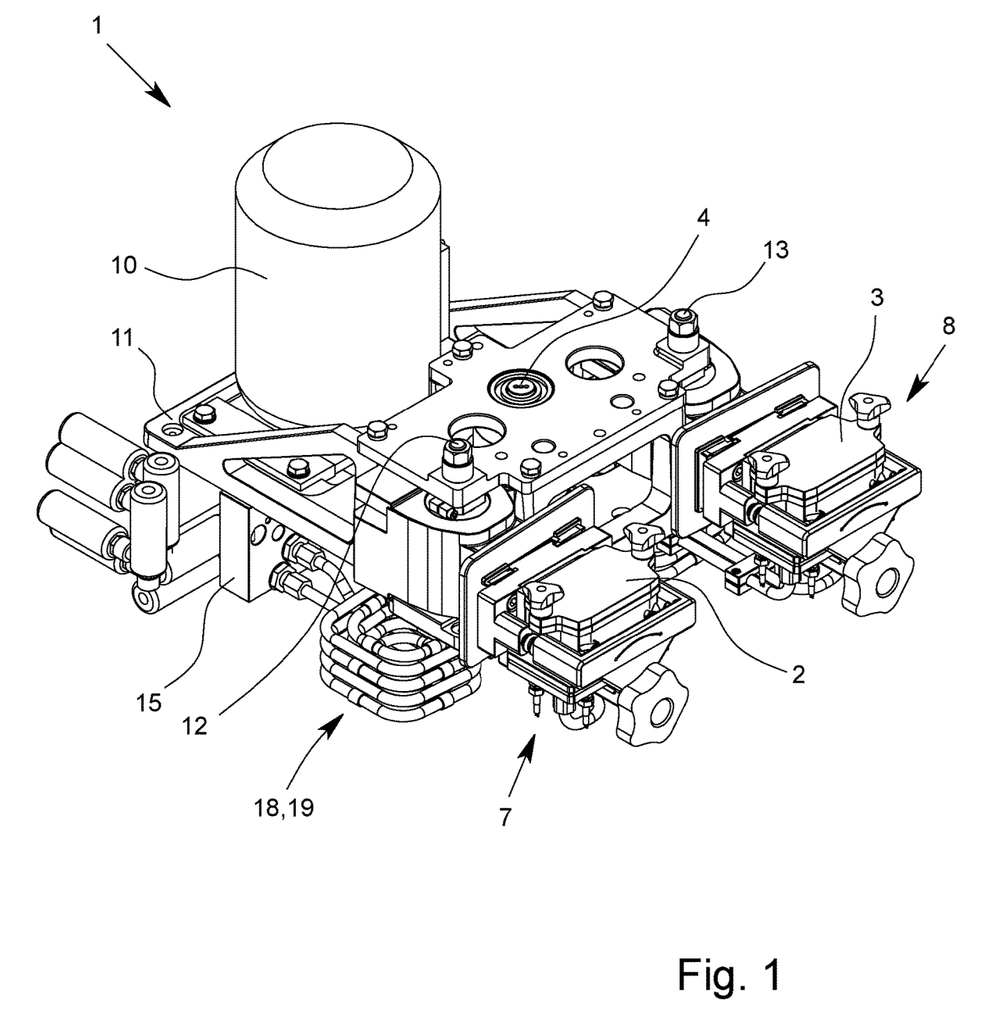
FIG. 1 is a perspective view of a laboratory mill according to the invention.
Figure 2:
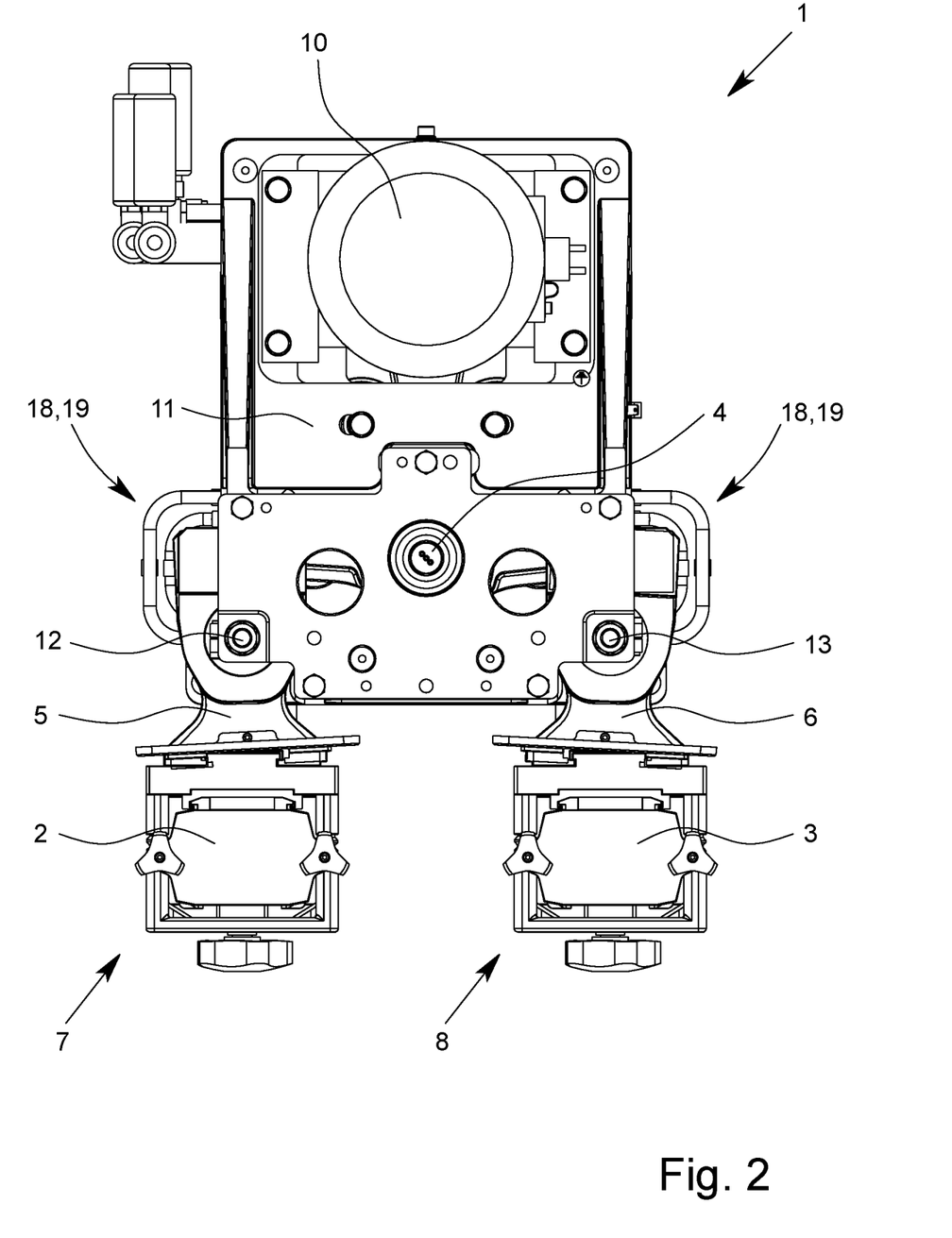
FIG. 2 is a top view of the laboratory mill from FIG. 1.
Figure 3:
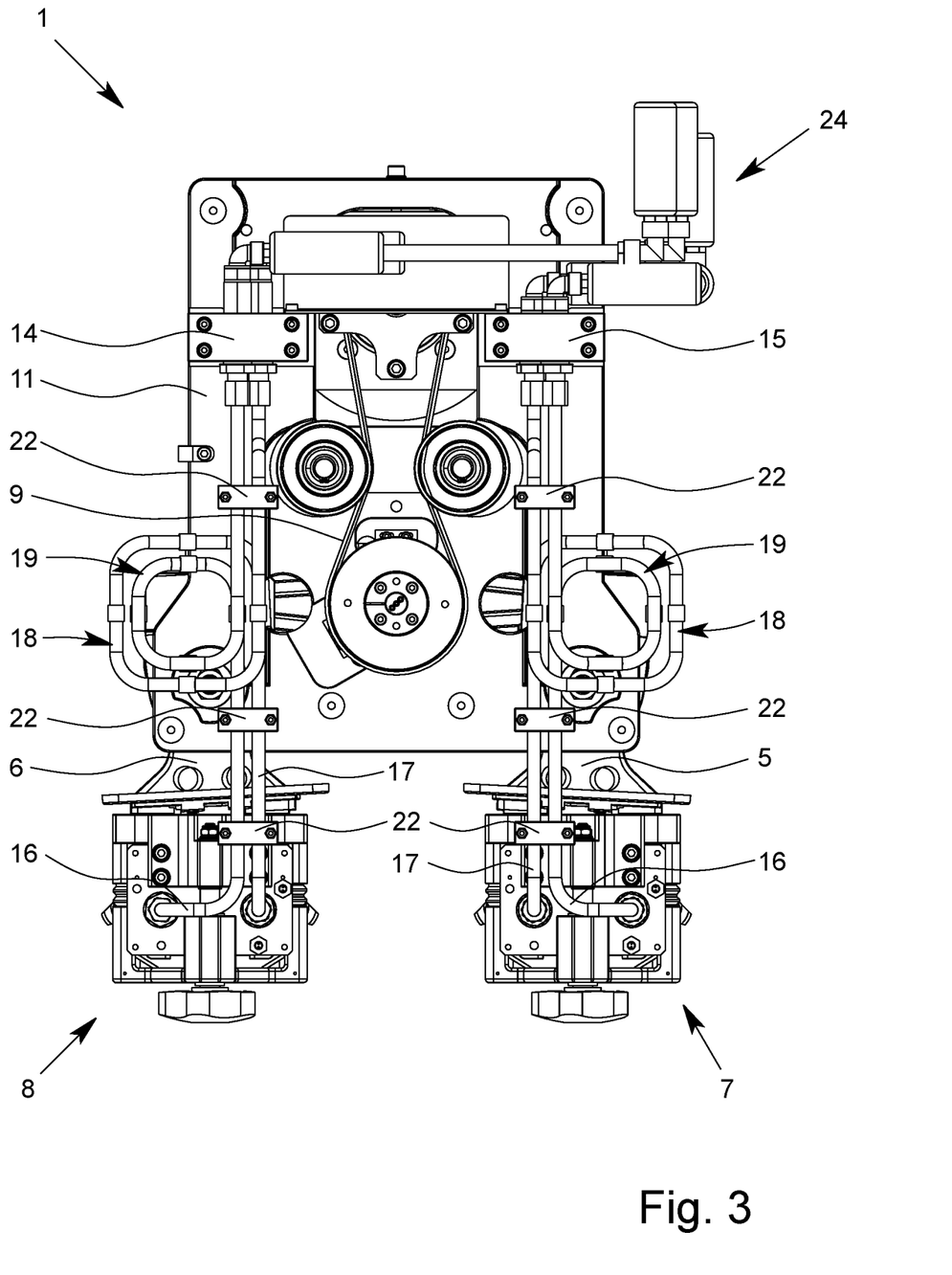
FIG. 3 is a view of the laboratory mill from FIG. 1 from below.
Figure 4:
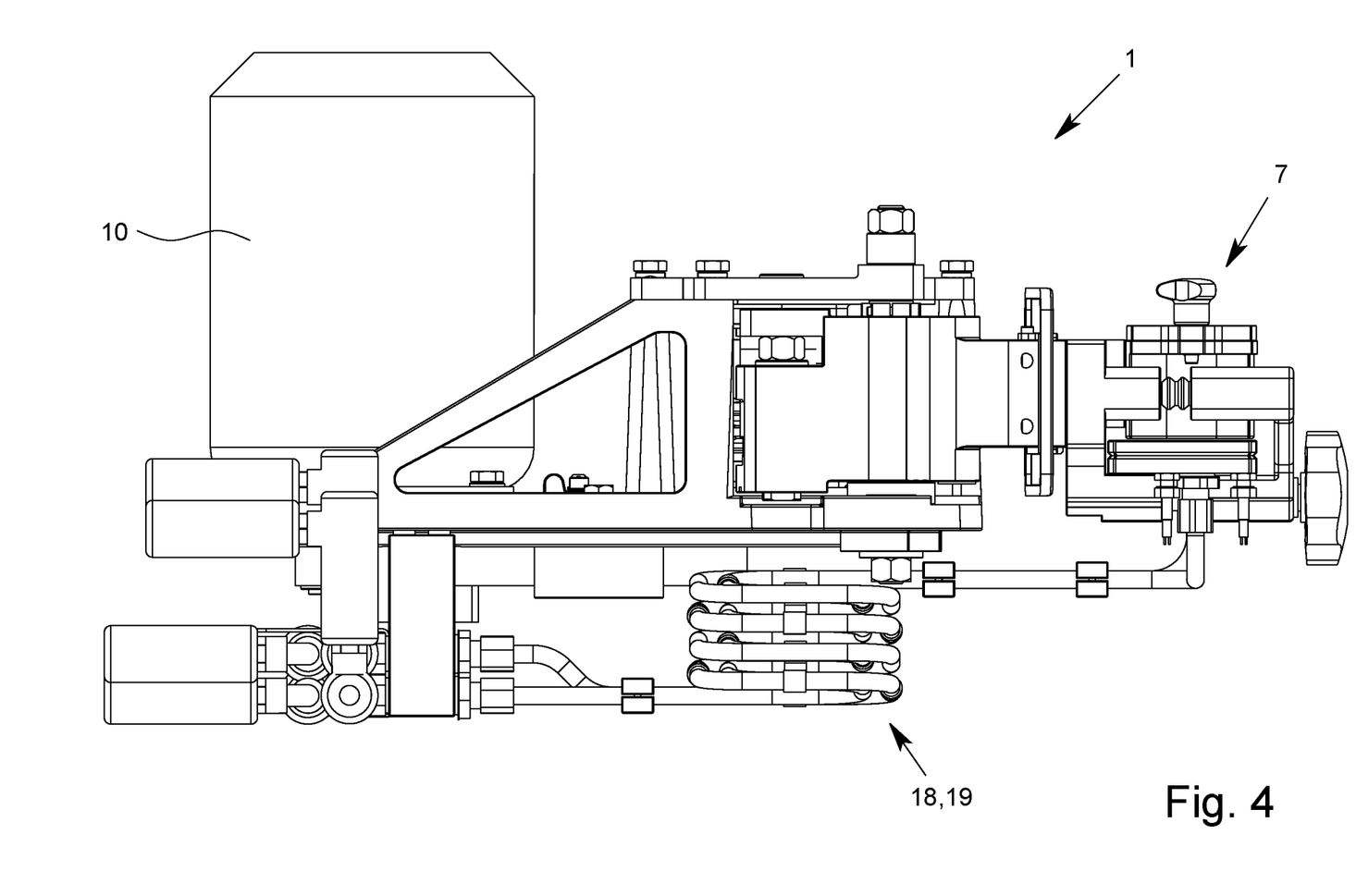
FIG. 4 is a side view of the laboratory mill from FIG. 1

FIG. 1 shows a top view of a oscillating mill 1 for two grinding bowls 2, 3 oscillating in a horizontal position. A pendulum drive of the oscillating mill 1 is of multi-part design with an eccentric shaft 4 mounted so as to be rotatable about a vertical eccentric axis and with two swing arms 5, 6, each mounted so as to be able to oscillate about vertical oscillation axes and connected to the eccentric shaft 4 via couplings. Grinding bowl holders 7, 8 for the grinding bowls 2, 3 are attached to the swing arms 5, 6. In addition, a motor unit 10 coupled to the eccentric shaft 4 via a V-belt 9 is provided for torque transmission. The eccentric shaft 4 is rotatably mounted on a base plate 11. In addition, two bearing bolts 12, 13 are attached to the base plate 11, around which the swing arms 5, 6 are rotatably mounted. Finally, the motor unit 10 is located on the base plate 11. The eccentric shaft 4, the bearing bolts 12, 13 and the motor unit 10 together with the base plate 11 thus form a construction unit which can stand on a floor or subsoil via damping elements.

The motor unit 10 transmits a torque via the V-belt 9 to the eccentric shaft 4. A rotary motion of the eccentric shaft 4 is converted via the couplings into an oscillating motion of the swing arms 5, 6. The oscillation frequency can be between 3 and 50 Hz, preferably up to 35 Hz. The oscillation path (double amplitude deflection) of the grinding bowl can be between 20 and 50 mm, preferably between 20 and 30 mm.

A tempering device not shown in detail can be used to temper grinding bowls 2, 3. To transport a tempering medium, which can be liquid or gaseous, from a stationary part 14, 15 of the oscillating mill 1 to a grinding bowl holder 7, 8 and to discharge the medium from the respective grinding bowl holder 7, 8 to the stationary part 14, 15, each grinding bowl holder 7, 8 is connected to two lines 16, 17. In each case, one of the two lines 16, 17 is provided for the supply line, the other of the two lines 16, 17 for discharging a gas or liquid medium, in particular liquid nitrogen, from the respective grinding bowl holder 7, 8.

The lines 16, 17 are preferably designed as continuous uninterrupted pipelines. Lines 16, 17 can be made of stainless steel or plastic, for example, or have stainless steel and/or plastic.

The design of the line routing is the same for both grinding bowl holders 7, 8, so that only one-line routing is described below as an example. The line arrangement with the lines 16, 17 of one grinding bowl holder 7 is mirror-symmetrical to the line arrangement of the second grinding bowl holder 8.

To compensate for relative movements between a grinding bowl holder 7, 8 and the stationary part 14, 15 assigned via the lines 16, 17 during operation of the oscillating mill 1, each line 16, 17 has a compensating element 18, 19. The entire length of each line 16, 17 is designed as a rigid pipeline, with the compensating element 18, 19 being formed by a pipeline section of line 16, 17.

During operation of the oscillating mill 1, the relative movements cause an oscillating deformation of the pipeline sections forming the compensating elements 18, 19, whereby the pipeline sections of the respective line 16, 17 adjacent to the compensating elements 18, 19 are deformed comparatively less. The design of the compensating elements 18, 19 as rigid pipeline sections enables the compensation of relative movements without using line sections which are connected to each other in a rotatable and/or swiveling manner relative to each other. In particular, it is not necessary to use the rotary unions known from the state of the art to compensate for relative movements, so that a hermetically sealed, uninterrupted connection and a permanently leakage-free transport of the tempering medium between the grinding bowl holders 7, 8 and the stationary parts 14, 15 is ensured in a simple manner. In particular, it is not necessary to use sealing elements to compensate for relative movements, as is the case with rotary unions.

For the connection of lines 16, 17 to the grinding bowl holders 7, 8 on the one hand, and for the connection to the stationary parts 14, 15 on the other hand, connection and accessory parts of the assembly technology known from the state of the art may be provided. The connection of the lines as such, i.e. decoupled from the compensation of relative movements, can be made by means of sealing material to enable a sealing connection between the respective line 16, 17 and the grinding bowl holders 7, 8 on the one hand and the stationary parts 14, 15 on the other hand.

Each compensation element 18, 19 is designed as a helical pipeline section with several coils or windings and is formed by essentially straight-line sections 20 and curved corner sections 21. During the compensation of movement, the deformation of the line sections forming the compensating elements 18, 19 decreases from coil to coil, so that the pipeline sections at the end of the respective last coil are essentially no longer deformed. As a result, the compensation of movement essentially takes place exclusively in the area of the compensating elements 18, 19.

The formation of the compensating elements 18, 19 is done, for example, by forming, such as bending, straight pipe sections of the lines 16, 17.

The compensation elements 18, 19 of two lines 16, 17 connected to a grinding bowl holder 7, 8 are designed as nested helixes. This compensates for relative movements in all spatial directions while requiring little space for the installation of the lines 16, 17 inside the oscillating mill 1.

Figure 5:
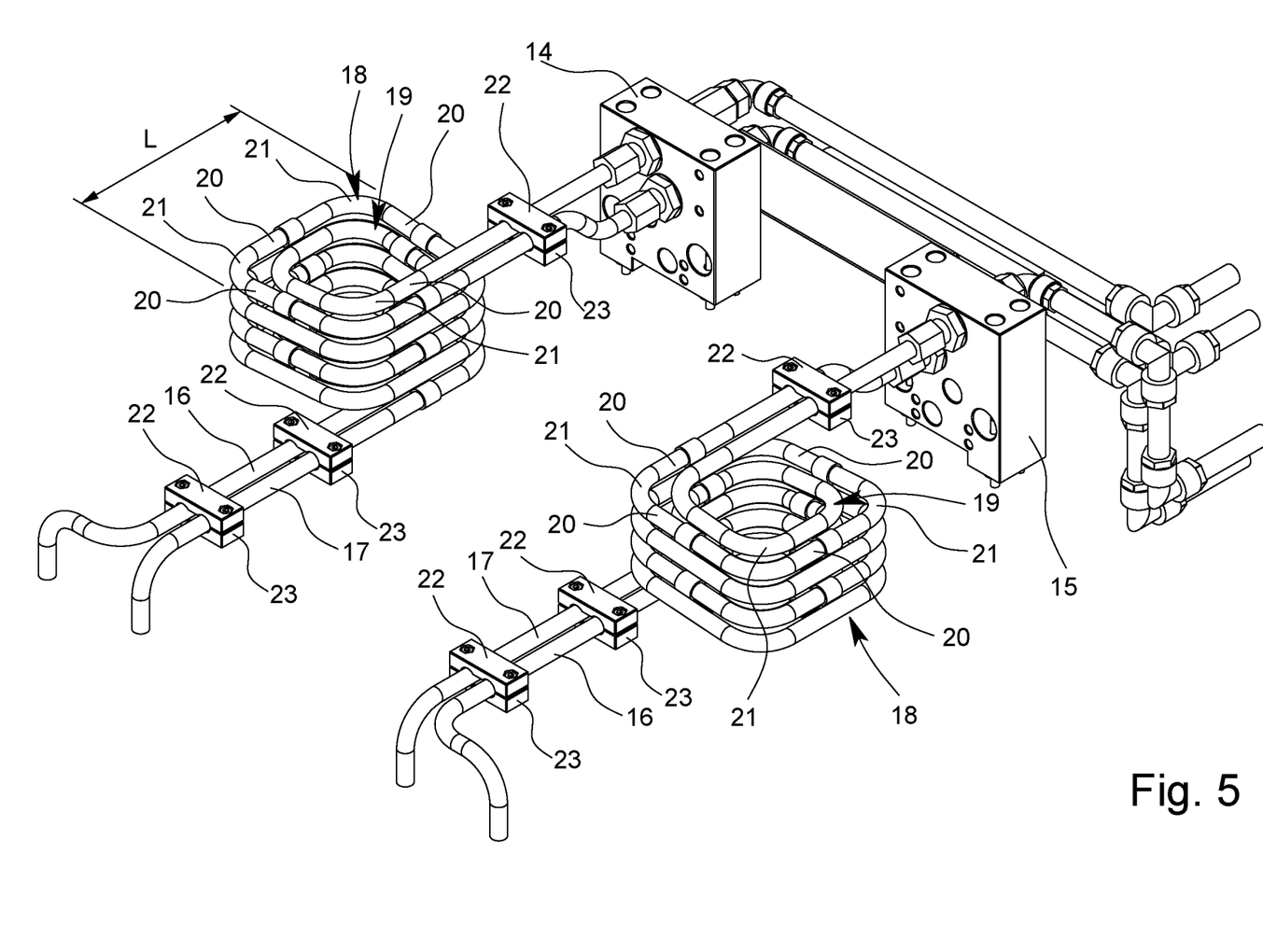
FIG. 5 is a perspective view of several lines of the laboratory mill shown in FIG. 1, which are provided for the supply and discharge of liquid or gaseous tempering media in the direction of the grinding bowl support or away from the grinding bowl support, each line being connected with one-line end to the grinding bowl support and with another line end to a stationary part of the laboratory mill.

The helically bent compensating element 18, 19 or the respective pipeline section of the line 16, 17 allows an increase in the line length compared to the line length with straight-line routing. This is shown schematically by comparison of FIG. 5, which shows helically bent compensating elements 18, 19, with FIG. 6, which shows a prior art arrangement with straight-line routing. The ratio of the actual line length of a compensating element 18, 19 to the line length L in the case of straight-line routing can be at least 5, preferably at least 10. This provides a sufficiently long line length to compensate for relative movements, to enable the compensation of relative movements with low stress and low deformation resistance.

In order to reduce the space required for the arrangement of the compensating elements 18, 19 inside the mill 1, the compensating element 18 is formed by a helix with, for example, four windings, while the nested internal compensating element 19 has five windings with a smaller circumference. It goes without saying that the type and design as well as the number of windings are to be understood as examples for the design of the oscillating mill 1 shown in FIGS. 1 to 5.

Two lines 16, 17 running parallel on each side of a grinding bowl holder 7, 8 are connected to each other via screwed clamping and holding parts 22, 23. This prevents relative movements between the lines 16, 17 from occurring in these line sections and compensates for movement primarily in the area of the helically bent compensating elements 18, 19.

The stationary parts 14, 15 are rigid blocks of e.g. polytetrafluoroethylene (PTFE), which are fixed to the base plate 11. The stationary parts 14, 15 are decoupled from the vibrating movement of the grinding bowl holders 7, 8. Inside the stationary parts 14, 15, channels are provided for the passage and transfer of the tempering medium to or from a supply and/or disposal device 24 for the tempering medium. For this purpose, the stationary parts 14, 15 are connected to the supply and/or disposal unit 24 via further pipelines.

REFERENCE CHARACTER LIST

1 Oscillating mill
2 Grinding bowl
3 Grinding bowl
4 Eccentric shaft
5 Swing arm
6 Swing arm
7 Grinding bowl holder
8 Grinding bowl holder
9 V-belt
10 Motor unit
11 Base plate
12 Bearing bolt
13 Bearing bolt
14 Stationary part
15 Stationary part
16 Line
17 Line
18 Compensating element
19 Compensating element
20 Line section
21 Corner section
22 Holding part
23 Holding part
24 Supply and/or disposal device

The invention claimed is:

1. A laboratory mill comprising:
at least one oscillatably mounted grinding bowl holder for at least one grinding bowl; and
at least one line for transporting a liquid or gaseous medium, the at least one line having at least one compensating element for compensating relative movements between the at least one grinding bowl holder and/or the at least one grinding bowl and a stationary part of the laboratory mill;

wherein the at least one compensating element is elastically deformed at least in regions during an oscillating movement of the at least one grinding bowl holder;

wherein the at least one compensating element is free or devoid of parts which are connected to one another movably relative to one another;

wherein the at least one line extends between the stationary part and the at least one grinding bowl holder;

wherein the at least one compensating element is spaced apart from the at least one grinding bowl holder in a direction of the stationary part;

wherein the at least one compensating element is configured as a substantially rigid tubular body; and wherein an oscillation path of the grinding bowl, relative to a center point of a grinding chamber inside the grinding bowl, is between 15 and 60 mm.

2. The laboratory mill according to claim 1, wherein the at least one compensating element consists of metal and/or wherein the at least one compensating element consists of a material resistant to cold at temperatures of less than −150° C.

3. The laboratory mill according to claim 2, wherein the metal is stainless steel or aluminum.

4. The laboratory mill according to claim 2, wherein the compensating element consists of a material resistant to cold at temperatures of less than −190° C.

5. The laboratory mill according to claim 1, wherein the at least one compensating element is a torsion spring or is configured to act as a torsion spring.

6. The laboratory mill according to claim 1, wherein the at least one line is configured over its entire length as a pipeline and the at least one compensating element is a section of the pipeline.

7. The laboratory mill according to claim 1, wherein the at least one line is elastically deformed during an oscillating movement of the at least one grinding bowl holder substantially only in a region of the at least one compensating element and wherein the deformation of the at least one compensating element decreases in a direction towards a line end connected to the stationary part.

8. The laboratory mill according to claim 1, wherein a line length of the at least one line is increased by the at least one compensating element compared with a line length in a case of straight-line routing.

9. The laboratory mill according to claim 8, wherein a ratio of the line length of the at least one compensating element to the line length in the case of straight-line routing is at least 5.

10. The laboratory mill according to claim 9, wherein the ratio of the line length of the at least one compensating element to the line length in the case of straight-line routing is at least 10.

11. The laboratory mill according to claim 1, wherein the at least one compensating element has at least one curved or angled line section, and wherein the at least one compensating element is configured as a helical line section or a line section arranged in the form of a flat or spatial spiral.

12. The laboratory mill according to claim 1, wherein the at least one line comprises at least two lines and the at least one compensating element comprises at least two compensating elements, and wherein the at least one grinding bowl is connected to the at least two lines for a supply and a discharge of a liquid or gaseous medium, each of the at least two lines having at least one of the at least two compensating elements.

13. The laboratory mill according to claim 12, wherein the compensating elements of the at least two lines are configured as line sections nested within one another and/or interspersed with one another.

14. The laboratory mill according to claim 12, wherein the compensating elements of the at least two lines are each configured as a helical line section or in the form of a flat or spatial spiral and wherein the line sections have a different number of turns and/or a different circumference.

15. A laboratory mill comprising:

at least one oscillatably mounted grinding bowl holder for at least one grinding bowl; and at least one line for transporting a liquid or gaseous medium, the at least one line having at least one compensating element for compensating relative movements between the at least one grinding bowl holder and/or the at least one grinding bowl and a stationary part of the laboratory mill;

wherein the at least one compensating element is elastically deformed at least in regions during an oscillating movement of the at least one grinding bowl holder;

wherein the at least one compensating element is free or devoid of parts which are connected to one another movably relative to one another;

wherein the at least one line extends between the stationary part and the at least one grinding bowl holder;

wherein the at least one compensating element is spaced apart from the at least one grinding bowl holder in a direction of the stationary part; and wherein an oscillation path of the grinding bowl, relative to a center point of a grinding chamber inside the grinding bowl, is between 15 and 60 mm.

16. A laboratory mill comprising:

at least one oscillatably mounted grinding bowl holder for at least one grinding bowl; and at least one line for transporting a liquid or gaseous medium, the at least one line having at least one compensating element for compensating relative movements between the at least one grinding bowl holder and/or the at least one grinding bowl and a stationary part of the laboratory mill;

wherein the at least one compensating element is elastically deformed at least in regions during an oscillating movement of the at least one grinding bowl holder;

wherein the at least one compensating element is free or devoid of parts which are connected to one another movably relative to one another;

wherein the at least one line extends between the stationary part and the at least one grinding bowl holder;

wherein the at least one compensating element is spaced apart from the at least one grinding bowl holder in a direction of the stationary part;

wherein the at least one line comprises at least two lines and the at least one compensating element comprises at least two compensating elements, and wherein the at least one grinding bowl is connected to the at least two lines for a supply and a discharge of a liquid or gaseous medium, each of the at least two lines having at least one of the at least two compensating elements;

wherein each of the at least two compensating elements of the at least two lines is arranged in the form of a spatial spiral and the spatial spirals of the at least two lines are nested within one another; and wherein an oscillation path of the grinding bowl, relative to a center point of a grinding chamber inside the grinding bowl, is between 15 and 60 mm.

* * * * *